US012343233B2

(12) United States Patent
Navarro et al.

(10) Patent No.: US 12,343,233 B2
(45) Date of Patent: Jul. 1, 2025

(54) DENTAL ALIGNER APPARATUS

(71) Applicants: Carlos F. Navarro, Dallas, TX (US); Rocklin Verespej, Aliso Viejo, CA (US)

(72) Inventors: Carlos F. Navarro, Dallas, TX (US); Rocklin Verespej, Aliso Viejo, CA (US)

( * ) Notice: Subject to any disclaimer, the term of this patent is extended or adjusted under 35 U.S.C. 154(b) by 0 days.

(21) Appl. No.: 18/587,792

(22) Filed: Feb. 26, 2024

(65) Prior Publication Data
US 2024/0268931 A1    Aug. 15, 2024

Related U.S. Application Data

(63) Continuation of application No. 17/482,401, filed on Sep. 22, 2021, now Pat. No. 11,911,237.

(60) Provisional application No. 63/082,935, filed on Sep. 24, 2020.

(51) Int. Cl.
     *A61C 7/28*        (2006.01)
(52) U.S. Cl.
     CPC ..................... *A61C 7/28* (2013.01)
(58) Field of Classification Search
     CPC .. A61C 7/28; A61C 7/285; A61C 7/10; A61C 7/36
See application file for complete search history.

(56) References Cited

U.S. PATENT DOCUMENTS

| | | | | |
|---|---|---|---|---|
| 597,582 | A * | 1/1898 | Knapp | A61C 7/10 433/7 |
| 618,105 | A * | 1/1899 | Knapp | A61C 7/10 433/7 |
| 5,620,321 | A * | 4/1997 | Thornburg | A61C 7/36 433/7 |
| 11,395,719 | B2 * | 7/2022 | Suriano | A61C 7/14 |
| 11,911,237 | B2 * | 2/2024 | Navarro | A61C 7/28 |
| 2003/0157455 | A1 * | 8/2003 | Teramoto | A61C 7/10 433/21 |
| 2009/0130621 | A1 * | 5/2009 | Chikami | A61C 7/285 433/10 |
| 2013/0130190 | A1 * | 5/2013 | Lewis | A61C 7/00 433/18 |
| 2014/0329193 | A1 * | 11/2014 | Jasper | A61C 7/36 433/19 |

* cited by examiner

*Primary Examiner* — Ralph A Lewis
(74) *Attorney, Agent, or Firm* — The Watson IP Group, PLC; Jovan N. Jovanovic

(57) ABSTRACT

A dental aligner apparatus is comprised of a bar, a rotatable end member, a slidable end member, and a spring member. The bar includes a first end member and a second end member. The rotatable end member is disposed at a first end of the bar and coupled to the first end member. The slidable end member is disposed at a second end of the bar and coupled to the second end member. The spring member is disposed between the rotatable end member and the slidable end member and coupled to the first and second end members.

19 Claims, 15 Drawing Sheets

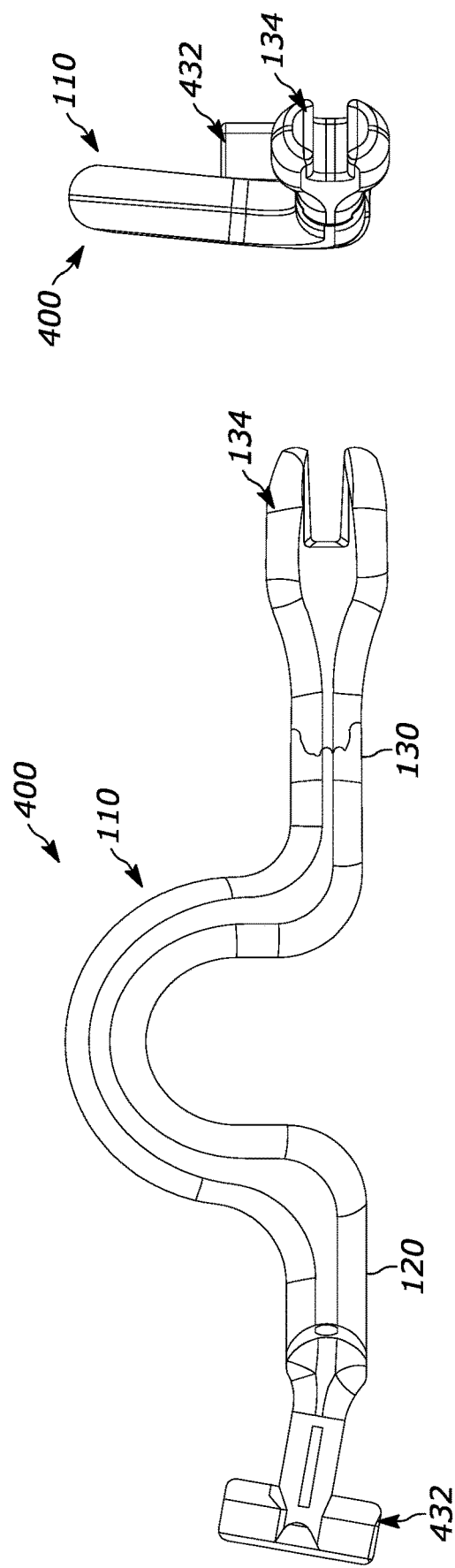

DENTAL ALIGNER APPARATUS

CROSS-REFERENCE TO RELATED APPLICATION

This present application is a continuation of U.S. patent application Ser. No. 17/482,401 filed on Sep. 22, 2021, entitled "DENTAL ALIGNER APPARATUS", which claims priority from U.S. Pat. App. Ser. No. 63/082,935 filed Sep. 24, 2020, entitled "DENTAL ALIGNER APPARATUS", the entire disclosure of each of which is hereby incorporated by reference in its entirety.

BACKGROUND OF THE DISCLOSURE

1. Field of the Disclosure

The disclosure relates in general to an aligner apparatus, and more particularly, to a dental aligner apparatus.

2. Background Art

Proper function of the masticatory complex is important not only for food digestion, but also for upper-airway respiratory dynamics, a restful sleep, and speech production. Dysgnathic malformations typically extend beyond the teeth to include the maxilla, the mandible, or both. Effective masticatory function as well as respiratory, sleep, and speech dynamics depend on effective tooth alignment and a harmonious balance between all the dento-skeletal elements of the masticatory system—the dental arches, ligamentous attachments, mandibular body, and alveolar bone and soft tissues. Dysgnathic deformities should typically be treated by a dental practitioner as soon as a condition is detected and ideally before an age of maturity of the cranio-maxillo-facial complex, which varies with individuals. Any deficiency or malformation in this vital complex should typically be addressed as soon as possible after tooth eruption is complete for functional and aesthetic reasons.

BRIEF DESCRIPTION OF THE DRAWINGS

The disclosure will now be described with reference to the drawings wherein:

FIG. 4A illustrates a front view of yet another example dental aligner apparatus, in accordance the at least one configuration disclosed herein;

FIG. 4B illustrates a side view of the dental aligner apparatus shown in FIG. 4A, in accordance the at least one configuration disclosed herein;

SUMMARY OF THE DISCLOSURE

Figure 1A:
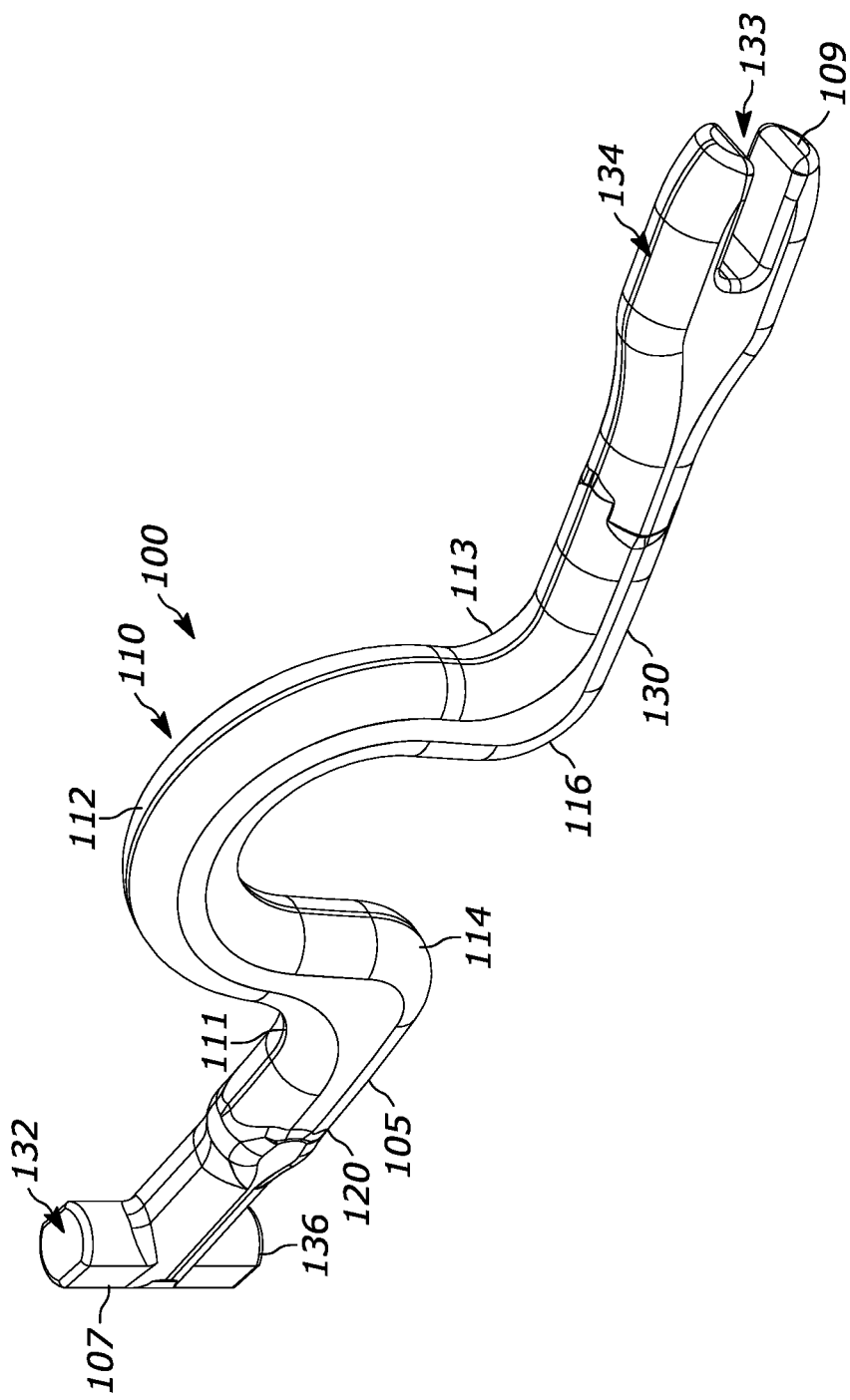
FIG. 1A illustrates an isometric view of an example dental aligner apparatus, in accordance the at least one configuration disclosed herein.

The disclosure is directed to a dental aligner apparatus comprised of a bar, a rotatable end member, a slidable end member, and a spring member. The bar includes a first end member and a second end member. The rotatable end member is disposed at a first end of the bar and coupled to the first end member. The slidable end member is disposed at a second end of the bar and coupled to the second end member. The spring member is disposed between the rotatable end member and the slidable end member and coupled to the first and second end members.

In at least one configuration of the dental aligner apparatus, the spring member is an Omega-shaped spring member.

In at least one configuration of the dental aligner apparatus, the spring member is a lower "V" shaped member, with a rounded point, that is coupled to a half-circle upper portion.

In at least one configuration of the dental aligner apparatus, the spring member is a coil spring member.

In at least one configuration of the dental aligner apparatus, the dental aligner apparatus further comprises at least one button hook coupled to the bar.

In at least one configuration of the dental aligner apparatus, the at least one button hook includes a first hook disposed proximate a first end of the bar and a second hook disposed proximate to a second end of the bar.

In at least one configuration of the dental aligner apparatus, the rotatable end member is a "T" shaped end member.

In at least one configuration of the dental aligner apparatus, the slidable end member is a fork-shaped end member with two prongs.

The disclosure is also directed to a system a dental aligner apparatus, a rotatable coupler, and a slidable coupler. The dental aligner apparatus is comprised of a bar, a rotatable end member, a slidable end member, and a spring member. The bar includes a first end member and a second end member. The rotatable end member is disposed at a first end of the bar and coupled to the first end member. The slidable end member is disposed at a second end of the bar and coupled to the second end member. The spring member is disposed between the rotatable end member and the slidable end member and coupled to the first and second end members. The rotatable coupler is coupled to the rotatable end member. The slidable coupler is coupled to the slidable end member.

In at least one configuration of the system, the spring member is an Omega-shaped spring member.

In at least one configuration of the system, the spring member is a lower "V" shaped member, with a rounded point, that is coupled to a half-circle upper portion.

In at least one configuration of the system, the spring member is a coil spring member.

In at least one configuration of the system, the dental aligner apparatus further comprises at least one button hook coupled to the bar.

In at least one configuration of the system, the at least one button hook includes a first hook disposed proximate a first end of the bar and a second hook disposed proximate to a second end of the bar.

In at least one configuration of the system, the rotatable end member is a "T" shaped end member.

In at least one configuration of the system, the slidable end member is a fork-shaped end member with two prongs.

The disclosure is also directed to a method comprising aligning a spring member of the dental aligner apparatus between the first tooth and the second tooth, securing a rotatable end member of the dental aligner apparatus to a rotational coupler coupled to the first tooth, and securing a slidable end member of the dental aligner apparatus to a slidable coupler coupled to the second tooth. The dental aligner apparatus is comprised of a bar, a rotatable end member, a slidable end member, and a spring member. The bar includes a first end member and a second end member. The rotatable end member is disposed at a first end of the bar and coupled to the first end member. The slidable end member is disposed at a second end of the bar and coupled to the second end member. The spring member is disposed between the rotatable end member and the slidable end member and coupled to the first and second end members.

In at least one configuration of the method, the spring member is an Omega-shaped spring member.

In at least one configuration of the method, the spring member is a lower "V" shaped member, with a rounded point, that is coupled to a half-circle upper portion.

In at least one configuration of the method, the spring member is a coil spring member.

DETAILED DESCRIPTION OF THE DISCLOSURE

While this disclosure is susceptible of configuration in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1B:
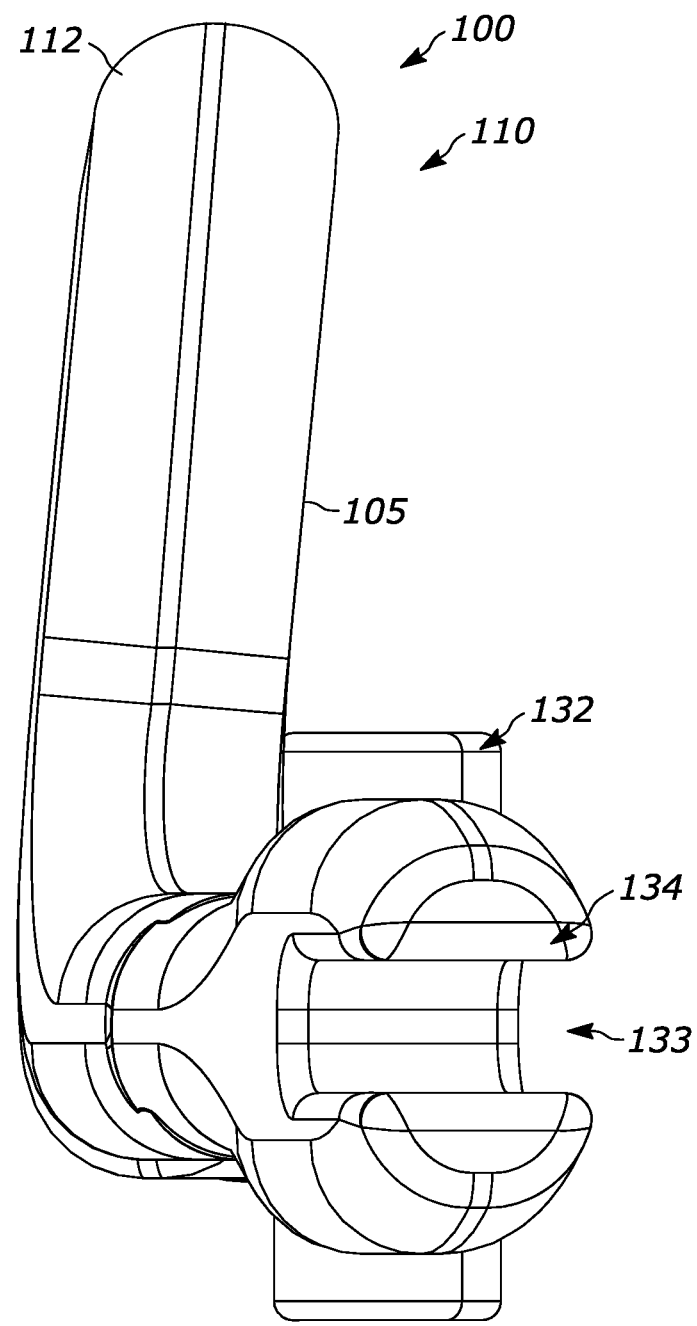
FIG. 1B illustrates a side view of the dental aligner apparatus shown in FIG. 1A, in accordance the at least one configuration disclosed herein.

Referring now to the drawings and in particular to FIGS. 1A and 1B, an example apparatus is disclosed, such as a dental aligner apparatus 100. The dental aligner apparatus 100 is a combination orthodontic-orthognathic apparatus that is designed for intraoral correction of dentoskeletal malocclusion. The dental aligner apparatus 100 disclosed herein can be used to correct bite issues. Its function is to move teeth back in their correct place. The dental aligner apparatus 100 is used when teeth have erupted in a wrong direction, with the ability to correct overbites as well as underbites. The dental aligner apparatus 100 can also be used in conjunction with specially design snap-on aligners to facilitate teeth movement. The dental aligner apparatus 100 can be indicated in cases of dysgnathia, whether congenital or physiologic, simple or complex, and other malformations of a patient's masticatory system associated with dental malocclusion. The dental aligner apparatus 100 can be used to correct tooth overcrowding from too-small dental arcades, a dysfunctional airway, and/or other pathology, and overbite and/or underbite by altering alveolar dimensions of the maxilla or mandible. The dental aligner apparatus 100 provides active compression/tension forces to keystone teeth of the anterior and posterior dental arches.

Figure 8:
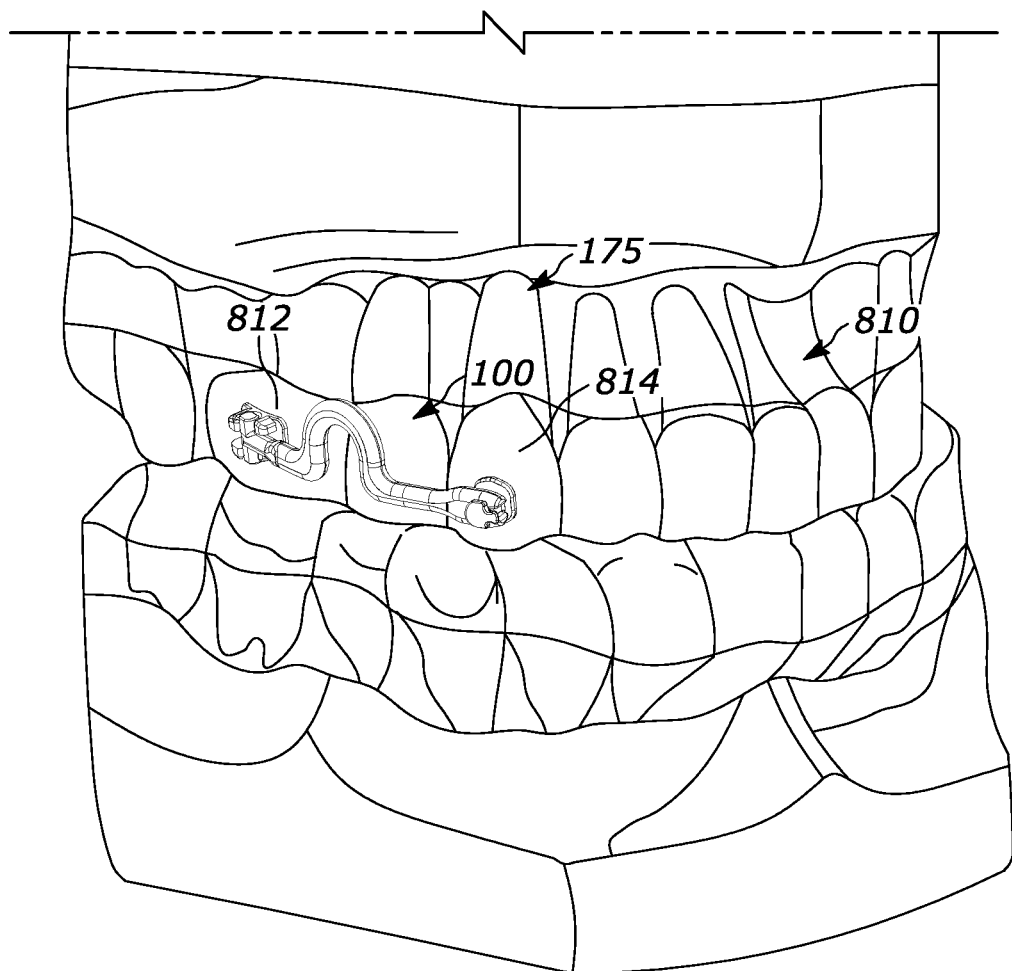
FIG. 8 illustrates example placement of the dental aligner apparatus on teeth, in accordance the at least one configuration disclosed herein.

The dental aligner apparatus 100 is a curved bar 105 including an example integrated spring member, such as an Omega-shaped integrated spring member 110 that provides active and passive compression, tension, and torsion forces to teeth 810 (FIG. 8), a first end member 120, and a second end member 130. The first end member 120 is coupled to a first end 111 of the spring member 110 and the second end member 130 is coupled to a second end 113 of the spring member 110, the spring member 110 being disposed between a first end 107 of the bar 105 and a second end 109 of the bar 105. As shown, the bar 105 is curved to approximately follow a contour of the teeth 810, but including enough deviation from the contour of the teeth 810 that the spring member 110 provides the active and passive compression, tension, and torsion forces to the teeth 810. In at least one configuration, the bar 105 has at outside radius of approximately 1.500 inches and an inside radius of approximately 1.435 inches. Thus, an orthodontist can also use elastics with the dental aligner apparatus 100 to produce a force strong enough to facilitate controlled and efficient movement of the teeth 810.

The bar 105 further includes a rotatable end member 132 disposed at the first end 107 of the bar and coupled to the first end member 120, and a slidable end member 134 disposed at the second end 109 of the bar 105 and coupled to the second end member 130. In at least one configuration, the rotatable end member 132 is a "T" shaped end member and the slidable end member 134 is a fork-shaped end member with two prongs as shown, although other types of ends are possible. FIG. 1B show the dental aligner apparatus 100 shown in FIG. 1A from the perspective of the second end 109. In particular, FIG. 1B shows that the spring member 110 is slightly angled to the right, with the relative alignment of a rotatable end member 132 and a slidable end member 134 including a slot 133 with the spring member 110, such that the rotatable end member 132 and the slidable end member 134 are disposed to the right of the spring member 110 because of the curvature of the bar 105. The rotatable end member 132 and the slidable end member 134 are disposed to the right of the spring member 110 to allow the bar 105 to follow a contour of the teeth 810. In at least one configuration, the rotatable end member 132 can be narrower than the first end member 120 and the slidable end member 134 can be wider than the second end member 130.

In at least one configuration, the spring member 110 includes a half-circle upper portion 112, a first elbow portion 114, and a second elbow portion 116. In at least one configuration, the upper portion 112 is curved, as shown, although other shapes are possible such as squared, rectangular, triangular, or another other shape, without departing from the scope of the configuration(s) disclosed. The upper portion 112 is coupled to the first end member 120 via the first elbow portion 114 and the upper portion 112 is coupled to the second end member 130 via the second elbow portion 116. The upper portion 112 can be configured with radiuses, the bar 105 can be configured with various lengths, and the first end member 120 and the second end member 130 can be configured with various cross-sectional shapes, based on sizes/locations of the teeth 810 being treated. For the example shown in FIGS. 1A-1B, an outer radius for the upper portion 112 can be approximately 0.165 inches, an inside radius of the upper portion 112 can be approximately 0.085 inches, the bar 105 can be approximately 1.215 inches long, the first end member 120 can be approximately 0.080 inches in diameter, and the second end member 130 can be approximately 0.070 inches in diameter.

To allow the dental aligner apparatus 100 to be coupled to the teeth 810 during use, the bar 105 includes the "T"-shaped end 132 and a slidable end member 134. In at least one configuration, the slidable end member 134 can have an opening of approximately 0.035 inches in height and approximately 0.097 inches in width. In at least one configuration, the "T"-shaped end 132 can be approximately 0.052 inches in width and have bars ends 136 that have a radius of approximately 0.031 inches. The "T"-shaped end 132 is disposed at the first end 107 of the bar 105 and the slidable end member 134 is disposed at the second end 109 of the bar 105, as shown.

Figure 2:
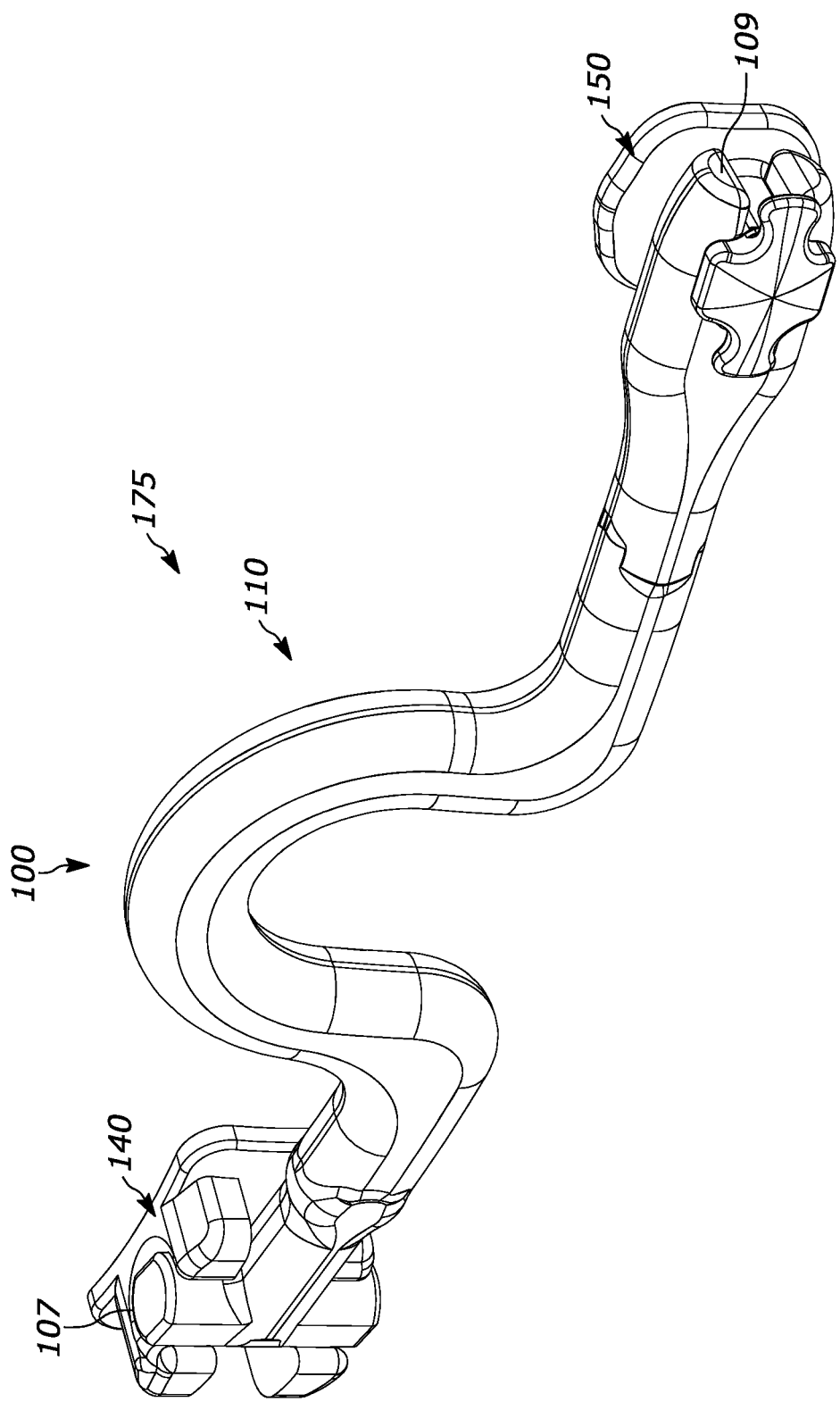
FIG. 2 illustrates another isometric view of the dental aligner apparatus shown in FIG. 1A, coupled to example couplers, in accordance the at least one configuration disclosed herein.

During use of the dental aligner apparatus 100, a system 175 (FIG. 2) includes the dental aligner apparatus 100 and a rotational coupler 140 to couple the "T"-shaped end 132 to a particular first tooth such as a molar 812, the "T"-shaped end 132 being employed to secure the dental aligner apparatus 100 against the teeth 810. The rotational coupler 140 allows the "T"-shaped end 132 to rotate when clipped thereto, as shown. In at least one configuration, the rotational coupler 140 can be a bracket (e.g., metal or polymer) as shown, although other teeth and other types of couplers are possible. The system 175 further includes a slidable coupler 150 to couple the slidable end member 134 to a particular second tooth such as a canine or cuspid 814. The slidable coupler 150 allows the slidable end member 134 to slide along the slidable coupler 150 when clipped thereto, as shown. In at least one configuration, the slidable coupler 150 can be a button (e.g., metal or polymer) as shown, although other teeth and other types of couplers are possible. The rotational coupler 140 and slidable coupler 150 can be positioned in various clockwise or counterclockwise rotations to achieve a desired alignment. The rotational coupler 140 and the slidable coupler 150 are coupled to these teeth via an adhesive (e.g., via an orthodontic adhesive).

During use, the spring member 100 is aligned between first and second teeth, such as the molar 812 and the canine or cuspid 814, the slidable end member 134 is secured or slide under the slidable coupler 150 that is pre-bonded to the cuspid 814 while the "T"-shaped end 132 is secured or snapped into the rotational coupler 140 that is pre-bonded to the molar 812 in the center of the alveolar process. This 3-rooted tooth will be tipped, rotated, and torqued to set the vertical dimension of the maxillofacial housing as the face develops. Once secured, the dental aligner apparatus 100 generates strong tension on the canine's long axis to change its orientation for improved occlusion. In at least one configuration, the dental aligner apparatus 100 is constructed out of a metal or polymer, although other materials are possible.

Figures 3A, 3B:
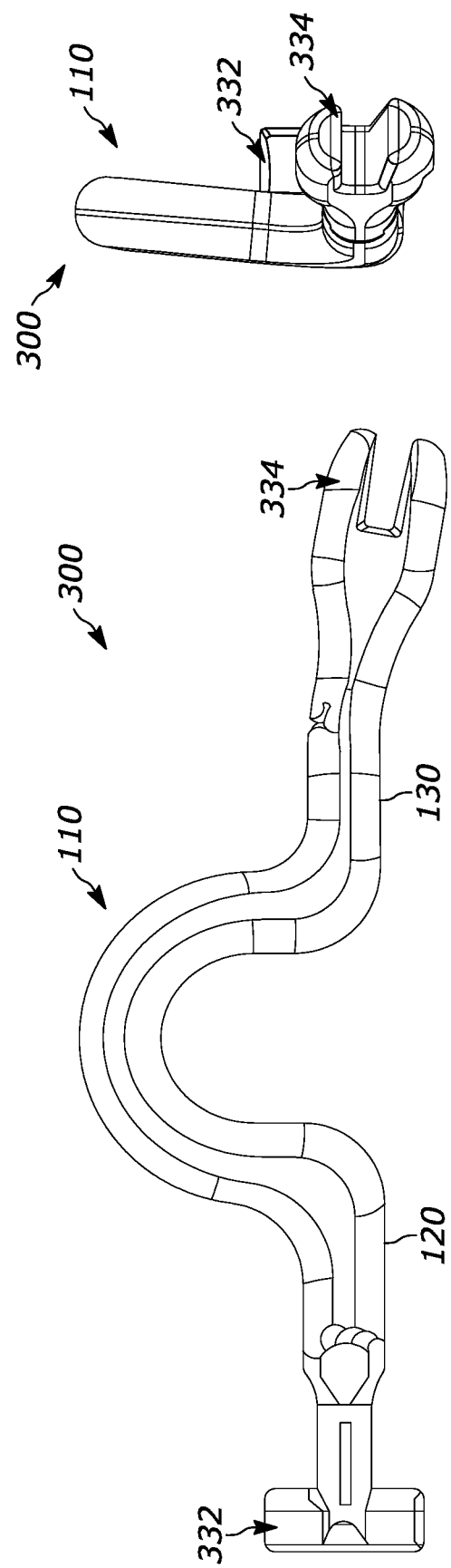
FIG. 3A illustrates a front view of another example dental aligner apparatus, in accordance the at least one configuration disclosed herein.
FIG. 3B illustrates a side view of the dental aligner apparatus shown in FIG. 3A, in accordance the at least one configuration disclosed herein.

FIGS. 3A and 3B show another example dental aligner apparatus, designated as dental aligner apparatus 300. The dental aligner apparatus 300 includes an alternate fork-shaped end, designated as fork-shaped end 334. In this configuration, the fork-shaped end 334 is angled slight downward from the second end member 130. In at least one configuration, the fork-shaped end 334 is angled downward approximately 10 degrees from the second end member 130. Thus, to accommodate different misalignments as well as increasing and decreasing angulation of the teeth 810, the "T" shaped end 332 can be angled, either upward or downward.

FIGS. 4A and 4B show another example dental aligner apparatus, designated as dental aligner apparatus 400. The dental aligner apparatus 400 includes an alternate "T" shaped end, designated as "T" shaped end 432. In this configuration, the "T" shaped end 432 is angled slight upward from the first end member 120. In at least one configuration, the "T" shaped end 432 is angled upward approximately 10 degrees from the first end member 120. Thus, to accommodate different misalignments as well as increasing and decreasing angulation of the teeth 810, the "T" shaped end 432 can be angled, either upward or downward. Thus, variants of the dental aligner apparatus 100, such as the dental aligner apparatus 300, 400 include pre-shaped angles at their mesial and distal ends so that three axes of torque can be applied to the teeth 810, e.g., molars and canines. Then, once the dental aligner apparatus has corrected a patient's bite, the orthodontist can remove it. After removing the dental aligner apparatus, the orthodontist will typically place standard aligners and/or braces on the teeth 810 that the patient still needs.

Figure 5:
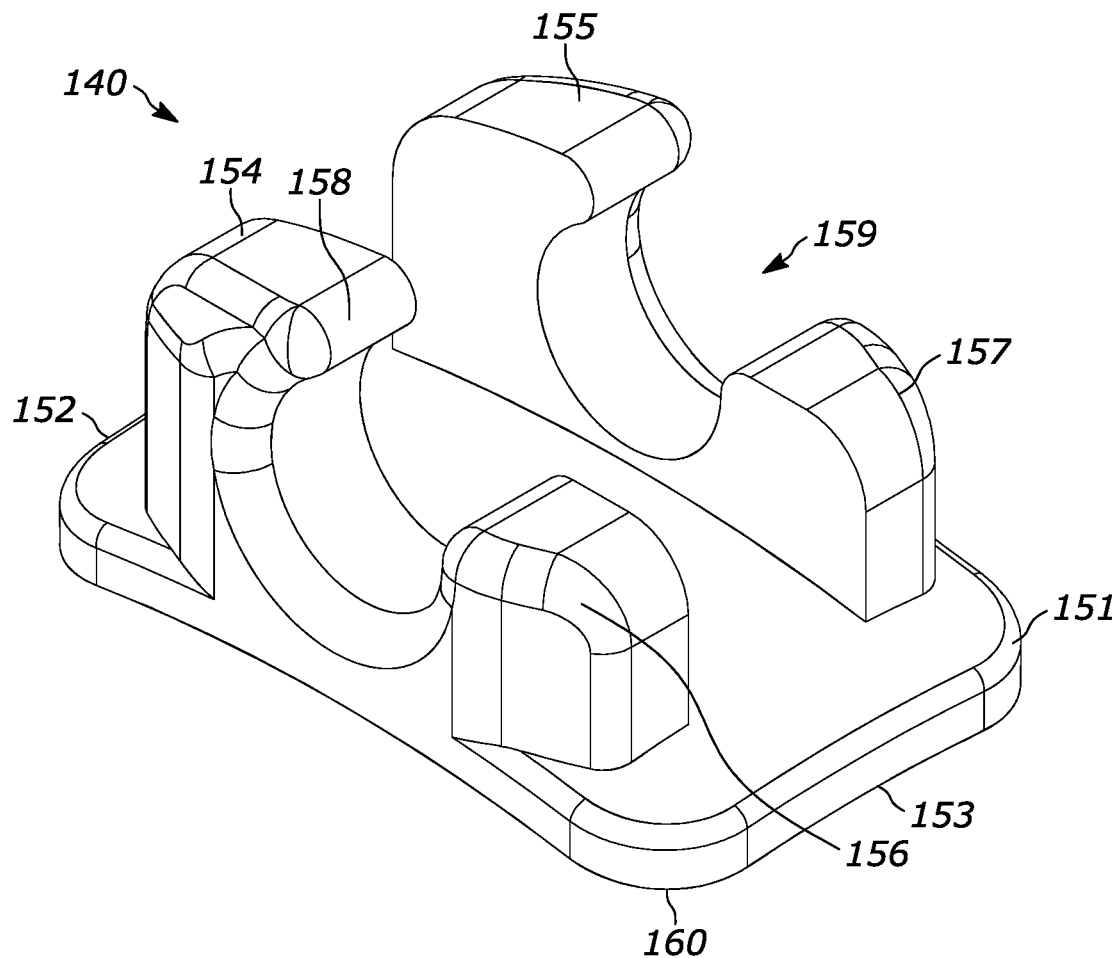
FIG. 5 illustrates an isometric view of an example bracket for use with the dental aligner apparatus, in accordance the at least one configuration disclosed herein.

Details of the rotational coupler 140 are shown in FIG. 5. The rotational coupler 140 includes a bracket base 151, a first hook member 154, a second hook member 155, a first securing member 156, and a second securing member 157. The bracket base 151 is shown as being curved and rectangular in shape with rounded corners, although other shapes are possible such as square, circular, oval, or another other shape that facilitates the bracket base 151 to be secured to the teeth 810. In at least one configuration, the bracket base 151 can have a radius curvature in both a length and width of approximately 0.500 degrees, with a width of approximately 0.220 inches and a height of approximately 0.140 inches.

Figure 13:
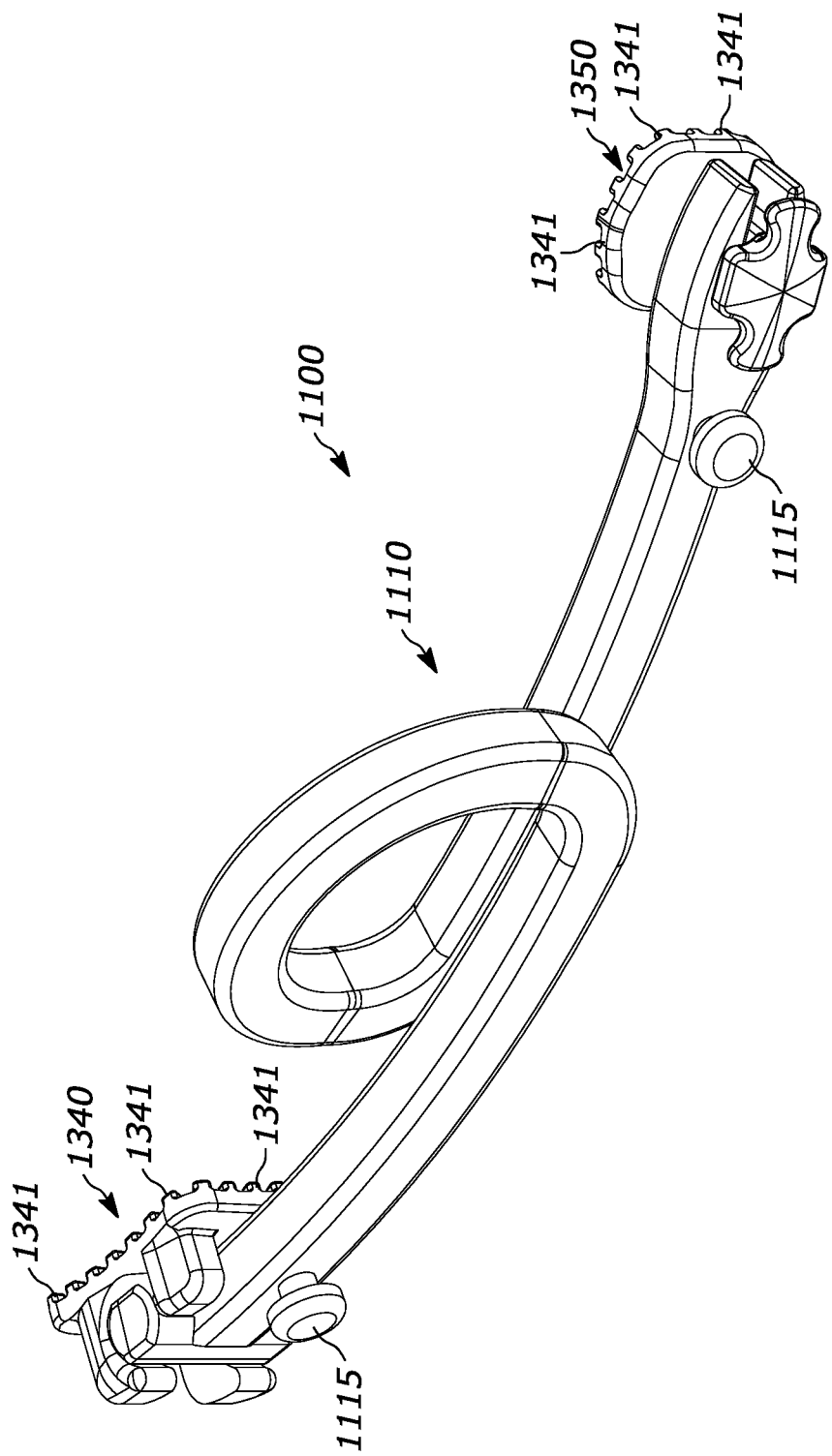
FIG. 13 illustrates an isometric view of the dental aligner apparatus shown in FIG. 11 coupled to another example rotational coupler and another example slidable coupler, in accordance the at least one configuration disclosed herein.

The bracket base 151 further includes a first end 152 and a second end 153, with a first hook member 154 and a second hook member 155 being disposed proximate to the first end 152 and a first securing member 156 and a second securing member 157 being disposed proximate to the second end 153, such that a bracket gap 159 is formed between the first and second hook members 154, 155 and the first and second securing members 156, 157. The first and second hook members 154, 155 are disposed on opposite sides of the bracket base 151 and the first and second securing member 156, 157 are likewise disposed on opposite sides of the bracket base 151. In at least one configuration, the rotational coupler 140 can include protrusions 1341 disposed on a bottom surface 160 of the bracket base 151, shown as rotational coupler 1340 in FIG. 13. The protrusions 1341 can be used to increase a surface area of the bottom surface 160 of the bracket base 151 such that the adhesive has a greater surface area to couple the rotational coupler 1340 to a tooth and thereby strengthening a bond therebetween.

The first hook member 154 and the second hook member 155 are taller in height as compared to the first securing member 156 and the second securing member 157. The first hook member 154 and the second hook member 155 each include curved ends 158 that curve towards the second end 153 of the bracket base 151. During use of the rotational coupler 140, the rotatable end member 132 of the dental aligner apparatus 100 is snapped into the bracket gap 159, with dimensions of the bracket gap 159 securing the rotatable end member 132 into the bracket gap 159, that is the first and second securing members 156, 157 securing the rotatable end member 132 against the first and second hook members 154, 155.

For the example shown in FIG. 5, a distance between ends of the first and second hook members 154, 155 and the first and second securing member 156, 157 can be approximately 0.160 inches, a distance between the first hook member 154 and the second hook member 155 and the first securing member 156 and the second securing member 157 can be approximately 0.060 inches, as shown, the first and second hook members 154, 155 can be a height of approximately 0.094 inches, the first and second securing members 156, 157 can be a height of approximately 0.60 inches, the bracket gap 159 can have an angle of approximately 94 degrees and an opening width of approximately 0.052 inches, and the bracket gap 159 can have a bottom radius of approximately 0.062 inches.

Figure 6:
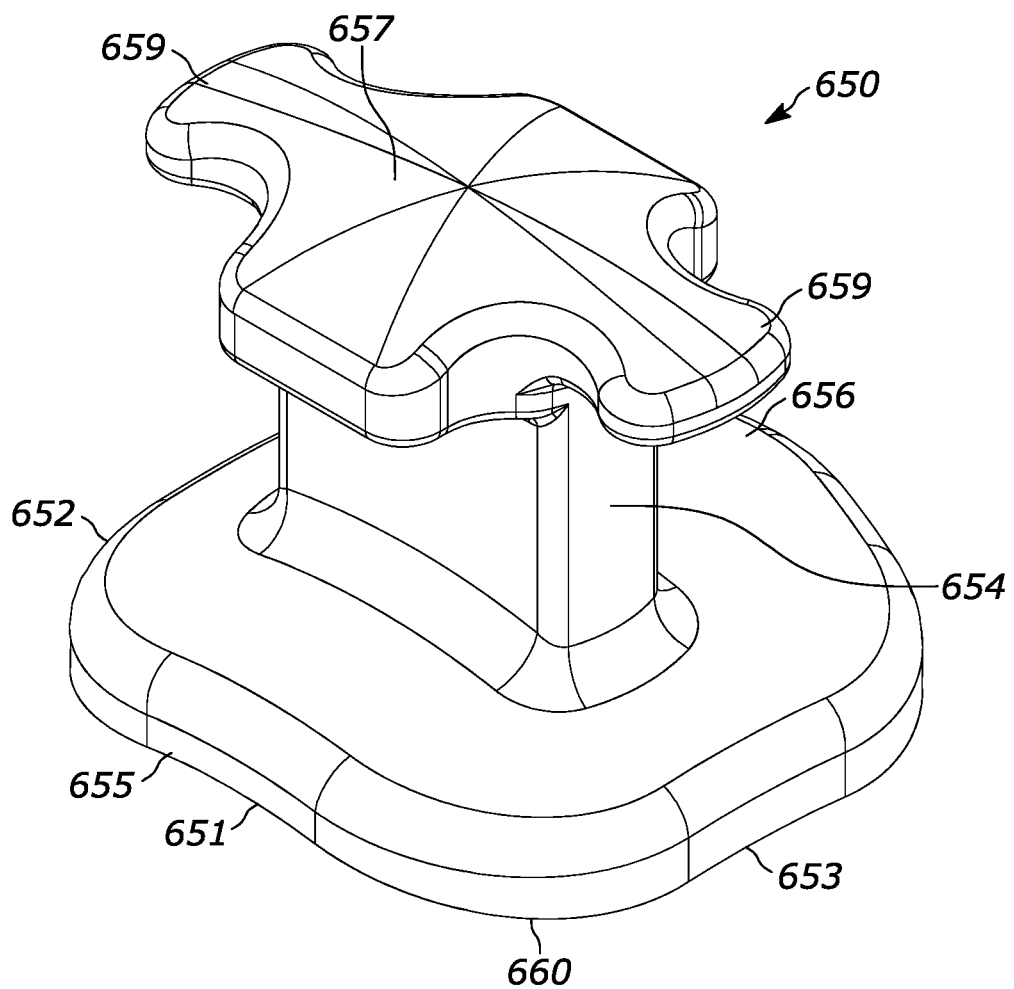
FIG. 6 illustrates an isometric view of an example button for use with the dental aligner apparatus, in accordance the at least one configuration disclosed herein.

Details of a first configuration of the slidable coupler are shown in FIG. 6, designated as slidable coupler 650. The slidable coupler 650 includes a button base 651, a pedestal 654, and a button head 657. The button base 651 is shown as being curved and approximately rectangular in shape with rounded corners, although other shapes are possible such as square, circular, oval, or another other shape that facilitates the button base 651 to be secured to the teeth 810. In at least one configuration, the button base 651 can be approximately 0.145 inches in width and approximately 0.150 inches in height, and have a radius curvature of approximately 0.265 inches. In at least one configuration, the slidable coupler 650 can include the protrusions 1341 disposed on a bottom surface 660 of the button base 651, shown as slidable coupler 1350 in FIG. 13. The protrusions 1341 can be used to increase a surface area of the bottom surface 660 of the button base 651 such that the adhesive has a greater surface area to couple the slidable coupler 1350 to a tooth and thereby strengthening a bond therebetween.

The button base 651 further includes a first end 652 and a second end 653, with the pedestal 654 being disposed approximately equidistant between the first end 652 and the second end 653. The button base 651 further includes a third end 655 and a fourth end 656, with the button base 651 forming a rounded bump-out at the fourth end 656, in at least one configuration forming an angle between the second end 653 and the fourth end 656, and between the first end 652 and the fourth end 656, of approximately 70 degrees. In at least one configuration, the button base 651 includes rounded corners where the ends 652, 653, 655, 656 meet.

In the configuration shown, the pedestal 654 is rectangular, such that the pedestal 654 is approximately 0.30 inches in length between fourth end 656 and third end 655 and 0.80 inches wide between first end 652 and second end 653. In at least one configuration, the pedestal 654 is approximately 0.057 inches in height, although other heights are possible. In the configuration shown, the button head 657 is "+" shaped, although other shapes are possible, including rounded, square, rectangular, triangular, oval, or any other shape that secures the slidable end member 134. Further, disposed at two opposite ends of the button head 657 are knob-shaped hooks 659 used when attaching elastics. In at least one configuration, the button head 657 is approximately the same width as the button base 651, as shown, although the button head 657 can be larger or smaller than the button base 651 without departing from the scope of the configurations(s). In at least one configuration, the button head can be approximately 0.145 inches in width, with a narrowest of its extensions being 0.043 inches in height, approximately 0.018 inches at is thinnest thickness and approximately 0.028 inches at its thickest thickness, as shown.

Figure 7:
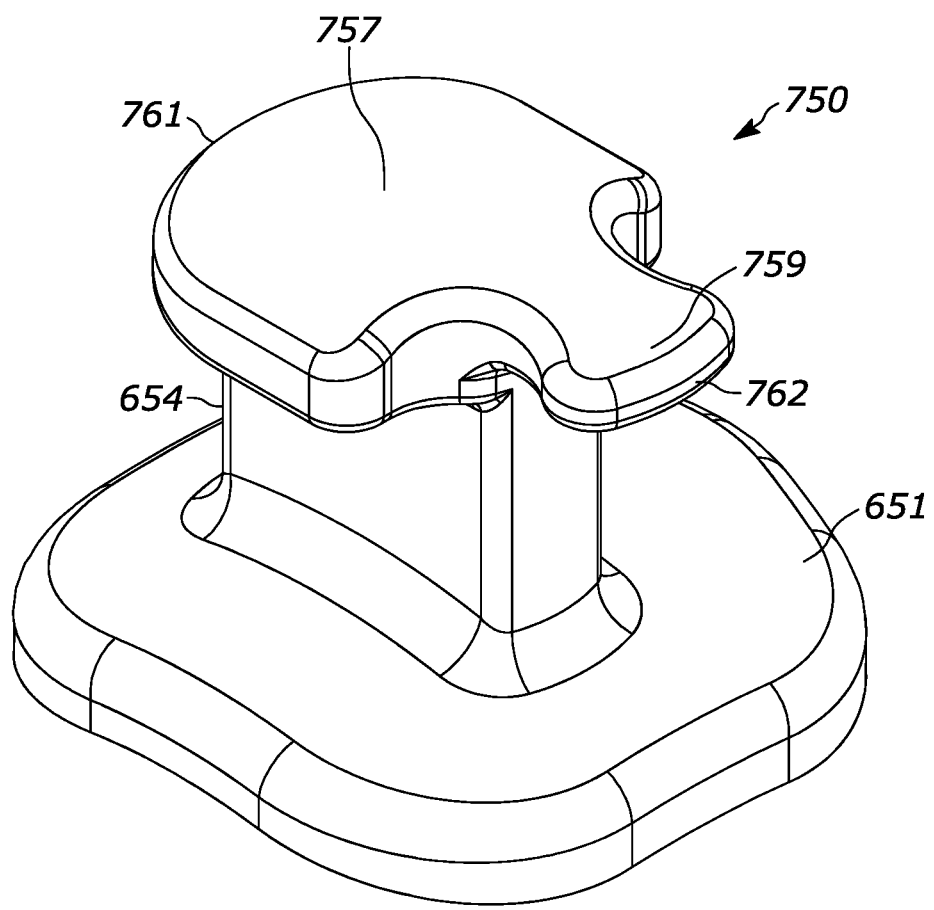
FIG. 7 illustrates an isometric view of another example button for use with the dental aligner apparatus, in accordance the at least one configuration disclosed herein.

FIG. 7 shows an alternate configuration for the slidable coupler 150, designated as slidable coupler 750. In this configuration, an alternate configuration for the button head is shown, designated as button head 757. The button head 757 includes a first end 761 and a second end 762, the button head 757 being rounded at the first end and including a knob-shaped hook 759 at the second end 762. In at least one configuration, the knob-shaped hook 759 is approximately 0.043 inches in height, with the button head 757 being approximately 0.090 inches in height and approximately 0.135 inches in width.

Figure 9:
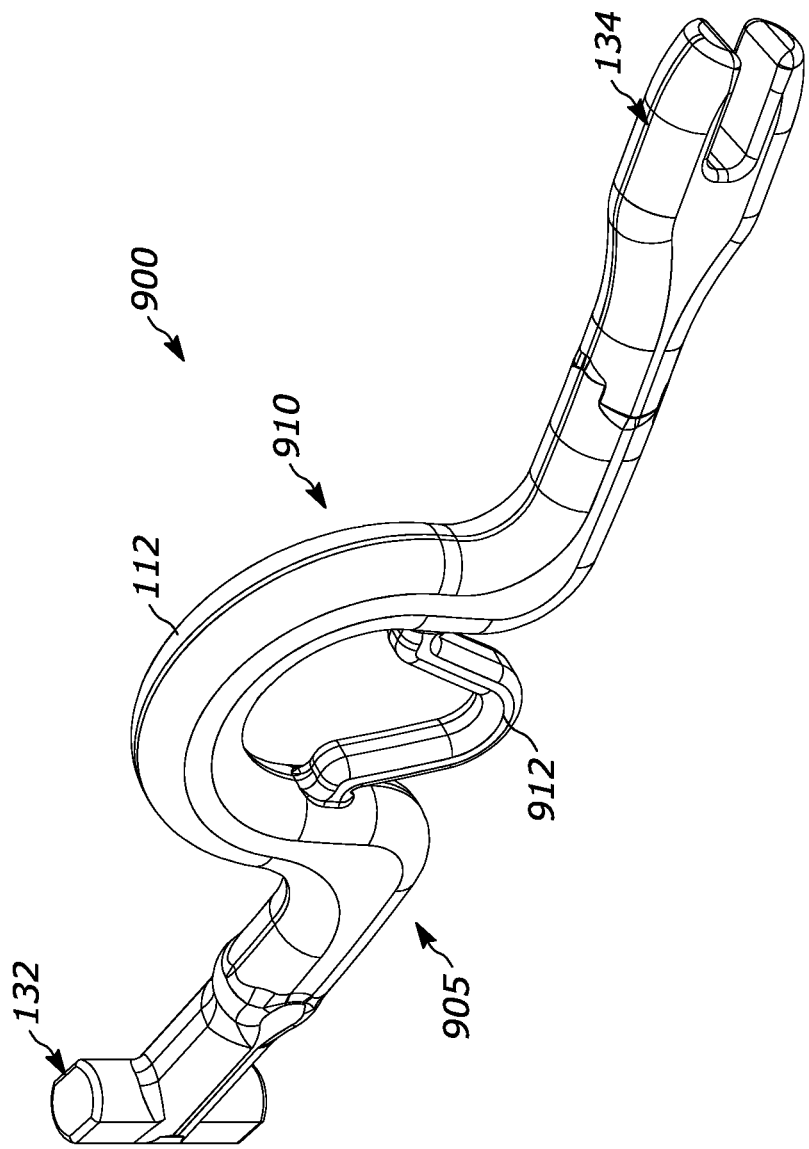
FIG. 9 illustrates an isometric view of another dental aligner apparatus, in accordance the at least one configuration disclosed herein.
Figure 10:
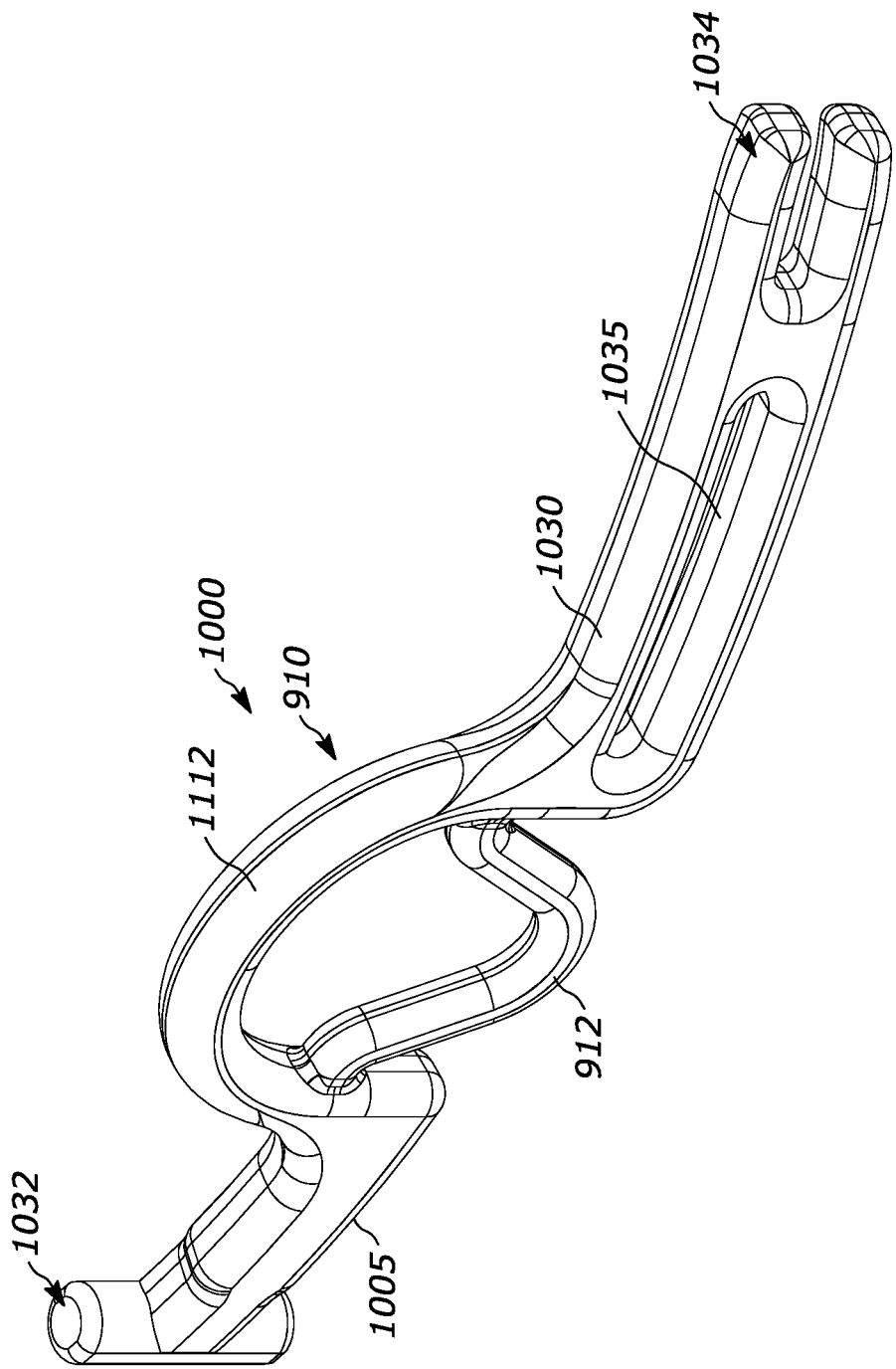
FIG. 10 illustrates an isometric view of yet another example dental aligner apparatus, in accordance the at least one configuration disclosed herein

With reference to FIGS. 9 and 10, other example dental aligner apparatuses including alternate bars are shown. FIG. 9 illustrates another example dental aligner apparatus 900 including a bar 905. The dental aligner apparatus 900 includes the bar 905 that includes another example integrated spring member, spring member 910. The spring member 910 includes a lower portion, such as a "V" shaped member 912 with a rounded point, that is coupled to the upper portion 112 approximately where the upper portion 112 couples the first elbow portion 114 and the second elbow portion 116, as shown. The "V" shaped member 912 extends in an opposite direction as the upper portion 112, where the upper portion 112 typically is disposed over a gum of the teeth 810 (FIG. 8), the "V" shaped member 912 extends downward over one or more of the teeth 810 during use, providing stiffness to the bar 905. The system 175 is shown as being coupled to top teeth in FIG. 8, although not shown one skilled in the art would appreciate that the system 175 can also be coupled to bottom teeth. As shown, the "V" shaped member 912 extends downward such a bottom of the "V" shaped member 912 is approximately in-line with bottoms of the first elbow portion 114 and the second elbow portion 116.

With reference to FIG. 10, FIG. 10 illustrates another example dental aligner apparatus 1000 including a bar 1005. The dental aligner apparatus 1000 includes the bar 1005 that includes an alternate second end member, second end member 1030. The second end member 1030 includes a slot 1035 that extends approximately (+−20%) a length of the second end member 1030. In this configuration, the second end member 1030 is approximately a same width as a fork-shaped end 1034, as shown. In at least one configuration, the first end member 120 can also or alternatively include the slot 1035.

In at least one configuration, the bar 1005 is approximately 1.08 inches in length, an upper portion 1112 of the spring member 910 has an outer radius of approximately 0.175 inches and an inner radius of approximately 0.125 inches, the second end member 1030 being approximately 0.120 inches in width, the "V" shaped member 912 having an angle of approximately 58 degrees, an inside radius of approximately 0.040 inches, an outside radius of approximately 0.080 inches, and a width of approximately 0.100 inches, an upper portion 1112 having an outside radius of approximately 0.175 inches and an inside radius of approximately 0.125 inches. For this configuration, the bar 1005 includes a "T" shaped end 1032 that is 0.053 inches in thickness, a fork-shaped end 1034 that has an opening that is approximately 0.030 inches, includes a distance of approximately 0.46 inches between the end of the "T" shaped end 1032 and the center of the upper portion 1112, and includes distance of approximately 0.42 inches between the center of the upper portion 1112 and the end of the fork-shaped end 1034.

Figure 11:
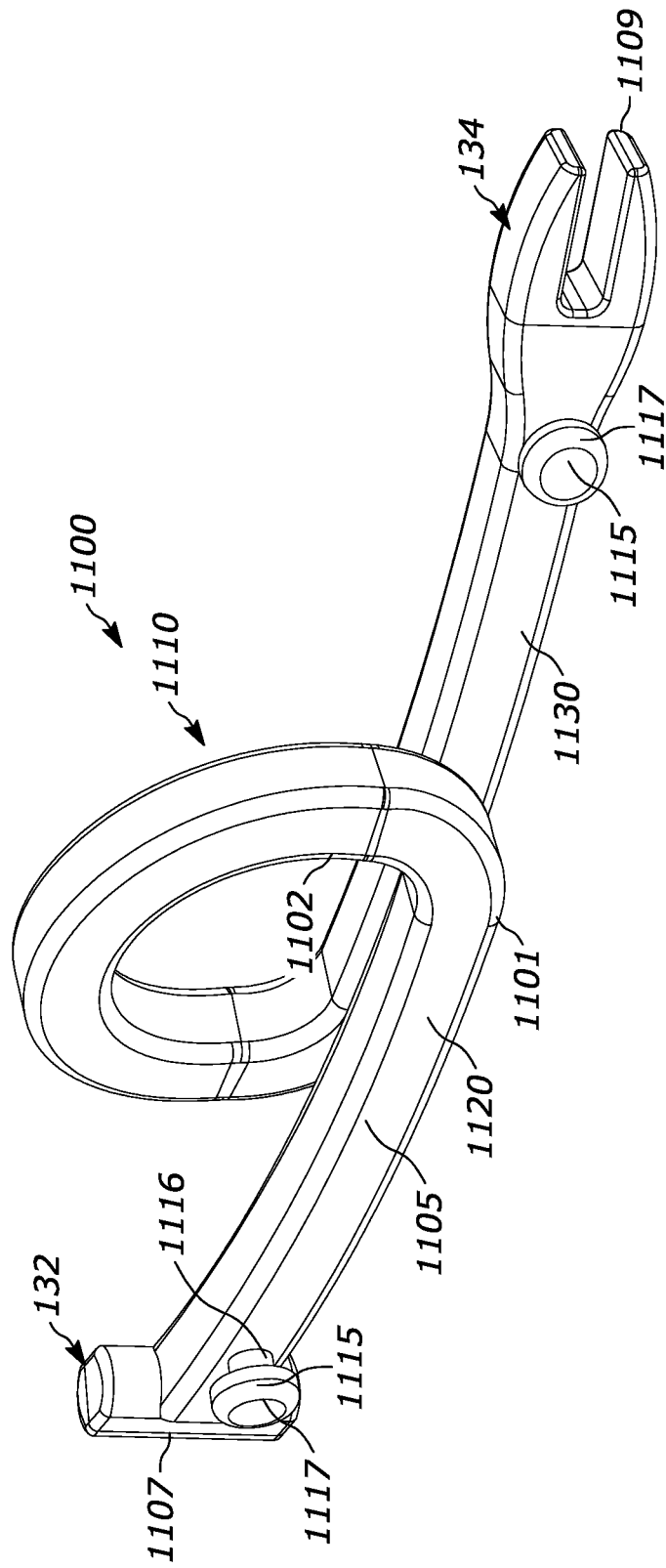
FIG. 11 illustrates an isometric view of another example dental aligner apparatus, in accordance the at least one configuration disclosed herein.

With reference to FIG. 11, another example dental aligner apparatus, shown as dental aligner apparatus 1100. Same components with the dental aligner apparatus 100, 300, 400, 900, 1000 discussed above as likewise shown. The dental aligner apparatus 1100 is a curved bar 1105 including another example integrated spring member, such as a coil shaped spring member 1110 that includes a single loop of a coil, as shown. In at least one configuration, the curved bar 1105 can have an inside radius of 38 mm and an outside radius of 39.5 mm. The dental aligner apparatus 1100 includes a first end member 1120 and a second end member 1130. The first end member 1120 is coupled to a first end 1101 of the spring member 1110 and the second end member 1130 is coupled to a second end 1102 of the spring member 1110, the spring member 1110 being disposed between a first end 1107 of the bar 1105 and a second end 1109 of the bar 1105.

Figure 12A:
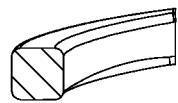
FIG. 12A illustrates a cross-sectional view of another example integrated spring member shown in FIG. 11, in accordance the at least one configuration disclosed herein.
Figure 12B:
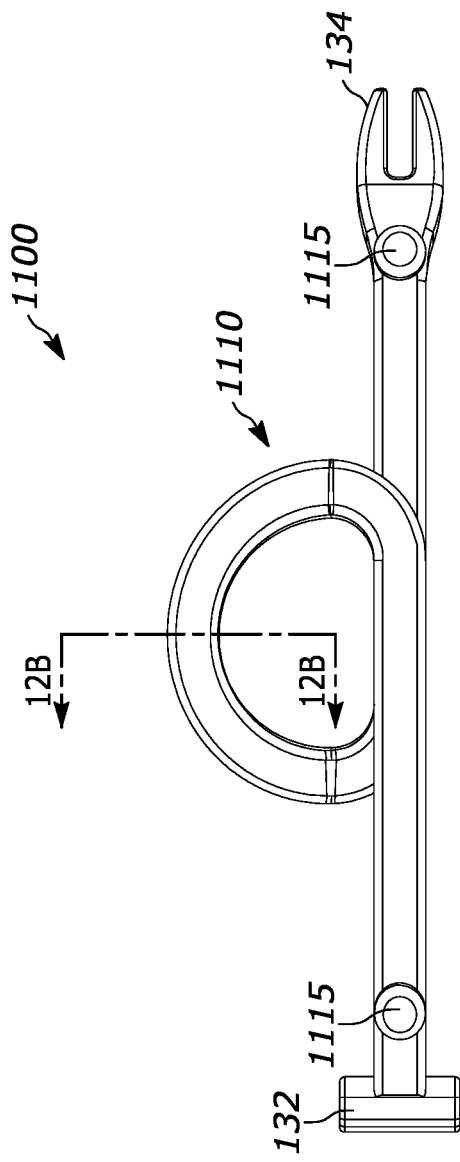
FIG. 12B illustrates a front view of the dental aligner apparatus shown in FIG. 11, in accordance the at least one configuration disclosed herein.
Figure 12C:
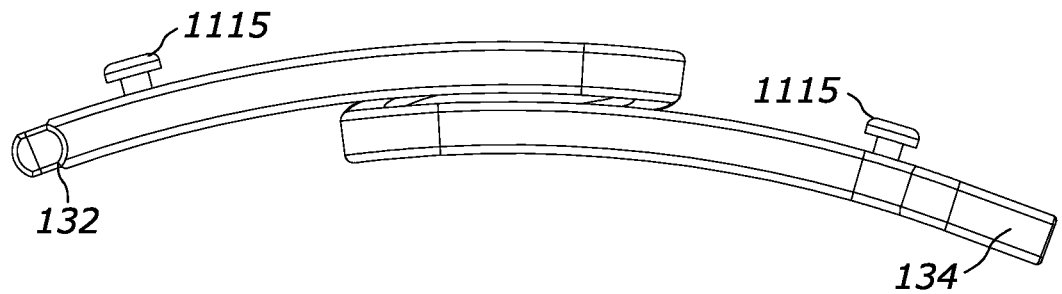
FIG. 12C illustrates a bottom view of the dental aligner apparatus shown in FIG. 11, in accordance the at least one configuration disclosed herein.
Figure 12D:
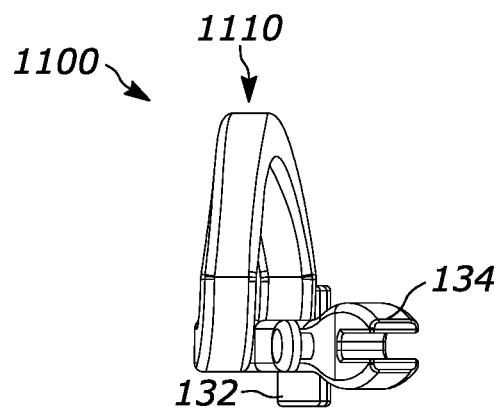
FIG. 12D illustrates a side view of the dental aligner apparatus shown in FIG. 11, in accordance the at least one configuration disclosed herein.

As shown in FIG. 12A, a cross-section of the spring member 1110 at location A-A shown in FIG. 12B is in at least one configuration square in shape with rounded corners, although in other configurations the spring member 1110 can be round, oval, or any other shape. The dimensions of the spring member 1110 can be 1.50 mm×1.50 mm. The spring member 1110 can have an inside radius of 3.5 mm and an outside radius of 5 mm. The dental aligner apparatus 1100 can be 30 mm in length, with a height of 7.5 mm, the spring member being 6 mm in height, and the first and second end members 1120, 1130 being 1.5 mm in height.

In at least one configuration, elastics can be used to supplement the force vector provided by the dental aligner apparatus 100, 300, 400, 900, 1000, 1100 so as to facilitate controlled movement of the keystone teeth which are the foundation of the upper or lower jaw bones and wherever has to be redirected for physiological stimulation as necessary to change the growth pattern forces that stimulates the body of the mandible to grow forward and since most of these patients are likely on active pre-Puberty stage. This is important from the orthopedic point of view. In prepubertal patients whose jaws are actively growing, this additional tension will stimulate forward growth of the mandibular body to a more mature, aesthetically pleasing, and physiologically efficient conformation. In at least one configuration, the dental aligner apparatus 100, 300, 400, 900, 1000, 1100 can further include pre-shaped "wings" or button hooks disposed at mesial and distal ends of the bars 105, 905, 1005, 1105 so that torque may be applied along the transverse, sagittal, and vertical vectors simultaneously during realignment of the canine and molars. As shown in FIGS. 11-12, the dental aligner apparatus 1100 is shown as including such pre-shaped "wings" or button hooks, designated as button hooks 1115 so disposed. The button hooks 1115 each include a post 1116 to which a disc shaped button 1117 is coupled. A first button hook 1115 can be disposed 4.2 mm from the first end 1107 of the bar 1105 and a second button hook 1115 can be disposed 5.4 mm from the second end 1109 of the bar 1105. One skilled in the art would appreciate that button hooks 115 can be coupled at likewise locations to any of the 100, 300, 400, 900, 1000.

The foregoing description merely explains and illustrates the disclosure and the disclosure is not limited thereto except insofar as the appended claims are so limited, as those skilled in the art who have the disclosure before them will be able to make modifications without departing from the scope of the disclosure. Accordingly, the dimensions disclosed above are described herein merely as examples, with one skilled in the art understanding that deviations therefrom are possible. Furthermore, the dimensions and angles disclosed above can vary according to manufacturing variations, e.g., +−10%, without departing from the disclosure herein.

What is claimed is:

1. A dental aligner apparatus comprising:
   a rotational coupler including:
      a bracket base having a bottom surface positionable over an outwardly facing surface of a first tooth, and attachable thereto;
      a first bar securing assembly extending along one side of the bracket base, with a second bar securing assembly extending along an opposite side of the bracket base, and defining a bracket channel therebetween;
      a first bracket gap defined in the first bar securing member and a second bracket gap defined in the second bar securing member, the first and second bracket gaps on opposing sides of the bracket channel, the first and second bracket gaps opening outwardly in a direction that is away from the bracket base;
   a bar having a first end and a second end opposite the first end, the bar being curved between the first and second ends, and including a spring formed thereby, the bar further including:
      a "T" shaped end member positioned at the first end of the bar, the "T" shaped end member having a first leg and a second leg opposite the first leg, together defining a rotatable end member;
      the second end adapted to terminate proximate at least one second tooth, wherein the first tooth and the second tooth are different,
   wherein the first leg is rotatably positionable within the first bracket gap, and the second leg is rotatably positionable within the second bracket gap, with the first end of the bar positionable within the bracket channel.

2. The dental aligner apparatus of claim 1 wherein the first and second legs of the "T" shaped end are configured to rotate about an axis of rotation that is defined by the first bracket gap and the second bracket gap.

3. The dental apparatus of claim 1 wherein the axis of rotation is substantially perpendicular to the bracket channel.

4. The dental aligner apparatus of claim 1 wherein the first bracket gap and the second bracket gap each have a substantially circular cross-sectional configuration.

5. The dental aligner apparatus of claim 4 wherein at least one of the first leg of the "T" shaped member and the second leg of the "T" shaped member comprises a cylindrical configuration between opposing flat sides.

6. The dental aligner apparatus of claim 5 wherein the cylindrical configuration substantially matches the substantially circular cross-sectional configuration.

7. The dental aligner of claim 5 wherein the opposing flat sides are spaced apart from each other a distance that is smaller than the outward opening of the first and second bracket gaps.

8. The dental aligner of claim 1 wherein the second end of the bar is attachable to a second bracket, with the second bracket being attachable to the second tooth.

9. The dental aligner of claim 8 wherein the second end of the bar is slidably movable along the second bracket.

10. A dental aligner apparatus comprising:
a rotational coupler including:
a bracket base having a bottom surface positionable over an outwardly facing surface of a first tooth, and attachable thereto;
a first securing member extending along one side of the bracket base at a front end of the bracket base and a first hook member along the one side of the bracket base at a second end, defining a first bracket gap therebetween;
a second securing member extending along an second side, opposite the one side of the bracket base at a front end of the bracket base and a second hook member along the second side of the bracket base, defining a second bracket gap therebetween;
the first securing member and the first hook member being spaced apart from the second securing member and the second hook member so as to define a bracket channel therebetween;
the first and second bracket gaps being aligned so as to define a transverse axis;
a bar having a first end and a second end opposite the first end, the bar being curved between the first and second ends, and including a spring formed thereby, the bar further including:
a "T" shaped end member positioned at the first end of the bar, the "T" shaped end member having a first leg and a second leg opposite the first leg, together defining a rotatable end member;
wherein the first leg is rotatably positionable within the first bracket gap, and the second leg is rotatably positionable within the second bracket gap, with the first end of the bar positionable within the bracket channel, such that the "T" shaped member is structurally configured to rotate about at least the transverse axis.

11. The dental aligner apparatus of claim 10 wherein the first bracket gap opens in a first direction that is away from the bracket base and the second bracket gap opens in a second direction that is away from the bracket base.

12. The dental aligner apparatus of claim 11 wherein the first bracket gap defines a first opening providing access thereto and the second bracket gap defines a second opening providing access thereto.

13. The dental aligner apparatus of claim 12 wherein the first bracket gap defines a substantially cylindrical portion having a first diameter, with the opening defining a first length between the first hook portion and the first securing member, wherein the first diameter is larger than the first length.

14. The dental aligner apparatus of claim 13 wherein the second bracket gap defines a substantially cylindrical portion having a second diameter, with the opening defining a second length between the second hook portion and the second securing member, wherein the second diameter is larger than the second length.

15. The dental aligner apparatus of claim 14 wherein the first leg includes opposing first leg cylindrical portions and opposing first leg flat regions, with the first leg cylindrical portions defining a first leg diameter, and the opposing first leg flat portions defining a first leg flat length, wherein the first leg flat length is smaller than the first length of the first opening, and the first leg diameter is larger than the first length of the first opening.

16. The dental aligner apparatus of claim 15 wherein the second leg includes opposing second leg cylindrical portions and opposing second leg flat regions, with the second leg cylindrical portions defining a second leg diameter, and the opposing second leg flat portions defining a second leg flat length, wherein the second leg flat length is smaller than the second length of the first opening, and the second leg diameter is larger than the second length of the second opening.

17. The dental aligner apparatus of claim 16 wherein the first leg cylindrical portion substantially corresponds in shape to the first bracket gap and the second leg cylindrical portion substantially corresponds in shape to the second bracket gap.

18. The dental aligner apparatus of claim 16 wherein a first plane defined by the first length of the first opening is oblique to the base bracket and a second plane defined by the second length of the second opening is oblique to the base bracket.

19. The dental aligner apparatus of claim 10 wherein the second end of the bar is spaced apart from the first end of the bar, with the second end of the bar attachable to a second bracket structurally configured to be attachable to a second tooth.

* * * * *